US007508862B2

(12) United States Patent
Bilgic et al.

(10) Patent No.: US 7,508,862 B2
(45) Date of Patent: Mar. 24, 2009

(54) DETERMINATION AND SELECTION OF TRANSMISSION PATHS AS A FUNCTION OF THE OPERATING SITUATION FOR SETTING UP RAKE FINGERS FOR RAKE RECEIVER UNITS IN MOBILE COMMUNICATION TERMINALS

(75) Inventors: Attila Bilgic, Kirchheim (DE); Mauro Bottero, Mougins Le Haut (FR); Jean-Xavier Canonici, Le Cannet (FR); Manfred Zimmermann, München (DE)

(73) Assignee: Infineon Technologies AG, Munich (DE)

( * ) Notice: Subject to any disclaimer, the term of this patent is extended or adjusted under 35 U.S.C. 154(b) by 707 days.

(21) Appl. No.: 10/957,408

(22) Filed: Oct. 1, 2004

(65) Prior Publication Data

US 2005/0111526 A1 May 26, 2005

(30) Foreign Application Priority Data

Oct. 2, 2003 (DE) ............................... 103 45 959

(51) Int. Cl.
*H03K 9/00* (2006.01)
*H04B 7/10* (2006.01)
*H03D 1/06* (2006.01)

(52) U.S. Cl. ................... 375/147; 375/316; 375/347; 375/348

(58) Field of Classification Search ......... 375/142–144, 375/148, 150, 299, 346, 343, 347, 349, 147; 375/316, 348; 370/328
See application file for complete search history.

(56) References Cited

U.S. PATENT DOCUMENTS 5,999,560 A * 12/1999 Ono .......................... 375/148

6,154,487 A * 11/2000 Murai et al. ................. 375/150
6,157,687 A * 12/2000 Ono .......................... 375/347
6,215,814 B1 * 4/2001 Ylitalo et al. ............... 375/148
6,229,842 B1 * 5/2001 Schulist et al. ............. 375/148

(Continued)

FOREIGN PATENT DOCUMENTS

EP  0 984 563 A2  3/2000

(Continued)

OTHER PUBLICATIONS

Povey, Gordon J.R. et al., "A Decision-Directed Spread-Spectrum RAKE Receiver for Fast-Fading Mobile Channels", 3, Aug. 1996, IEEE Transactions on Vehicular Technology, vol. 45, No. 3., pp. 491-502.*

(Continued)

*Primary Examiner*—Mohammad H Ghayour
*Assistant Examiner*—Sarah Hassan
(74) *Attorney, Agent, or Firm*—Eschweiler & Associates, LLC

(57) ABSTRACT

Correlations between the received signal to which pilot symbols have been applied at the transmitter end, and a correlation signal which contains the pilot symbols are carried out in the receiver in order to determine a path delay profile. Averaging processes are carried out over two or more delay profiles obtained in this way. Evaluations are carried out in one or more threshold value selection units (22.1, 22.2) on two or more averaged delay profiles with the aim of path selection. The parameters which govern the correlations and/or the averaging processes and/or the evaluations, and/or the repetition interval of these calculations are set as a function of the relative speed between the transmitter and the receiver, the frequency error between the carrier frequency of the received signal and the reference frequency that is set at the receiving end, and the noise level of the received signal. In the case of reception from two or more base stations, a final path selection is made in a finger allocation unit (40).

24 Claims, 7 Drawing Sheets

U.S. PATENT DOCUMENTS

| | | | |
|---|---|---|---|
| 6,330,271 B1 * | 12/2001 | Klang et al. | 375/134 |
| 6,373,882 B1 * | 4/2002 | Atarius et al. | 375/148 |
| 6,658,045 B1 * | 12/2003 | Jin | 375/147 |
| 6,714,585 B1 * | 3/2004 | Wang et al. | 375/148 |
| 2001/0028677 A1 * | 10/2001 | Wang et al. | 375/148 |
| 2001/0036222 A1 * | 11/2001 | Doetsch et al. | 375/148 |
| 2002/0054621 A1 * | 5/2002 | Kyeong et al. | 375/147 |
| 2002/0159422 A1 * | 10/2002 | Li et al. | 370/342 |

FOREIGN PATENT DOCUMENTS

| | | | |
|---|---|---|---|
| EP | 1 001 551 A2 | | 5/2000 |
| EP | 1533912 | * | 5/2005 |
| JP | 0945995 | * | 9/1999 |
| JP | 1120923 | * | 1/2001 |
| WO | WO 95/30289 A2 | | 11/1995 |

OTHER PUBLICATIONS

Sada, Tomokazu et. al., "Adaptive Resolution Control Scheme for RAKE Receiver Using Delay Profile Conversion Technique in DS/CDMA Systems", 2002, IEEE, Graduate School of Engineering, Osaka University, pp. 1-5.*

Adaptive resolution control scheme for RAKE receiver using delay profile conversion technique in DS/CDMA systems Sada, T.; Sampei, S.; Morinaga, N.; Vehicular Technology Conference, 2002. VTC Spring 2002. IEEE 55th vol. 4, May 6-9, 2002 pp. 2033-2037 vol. 4.*

* cited by examiner

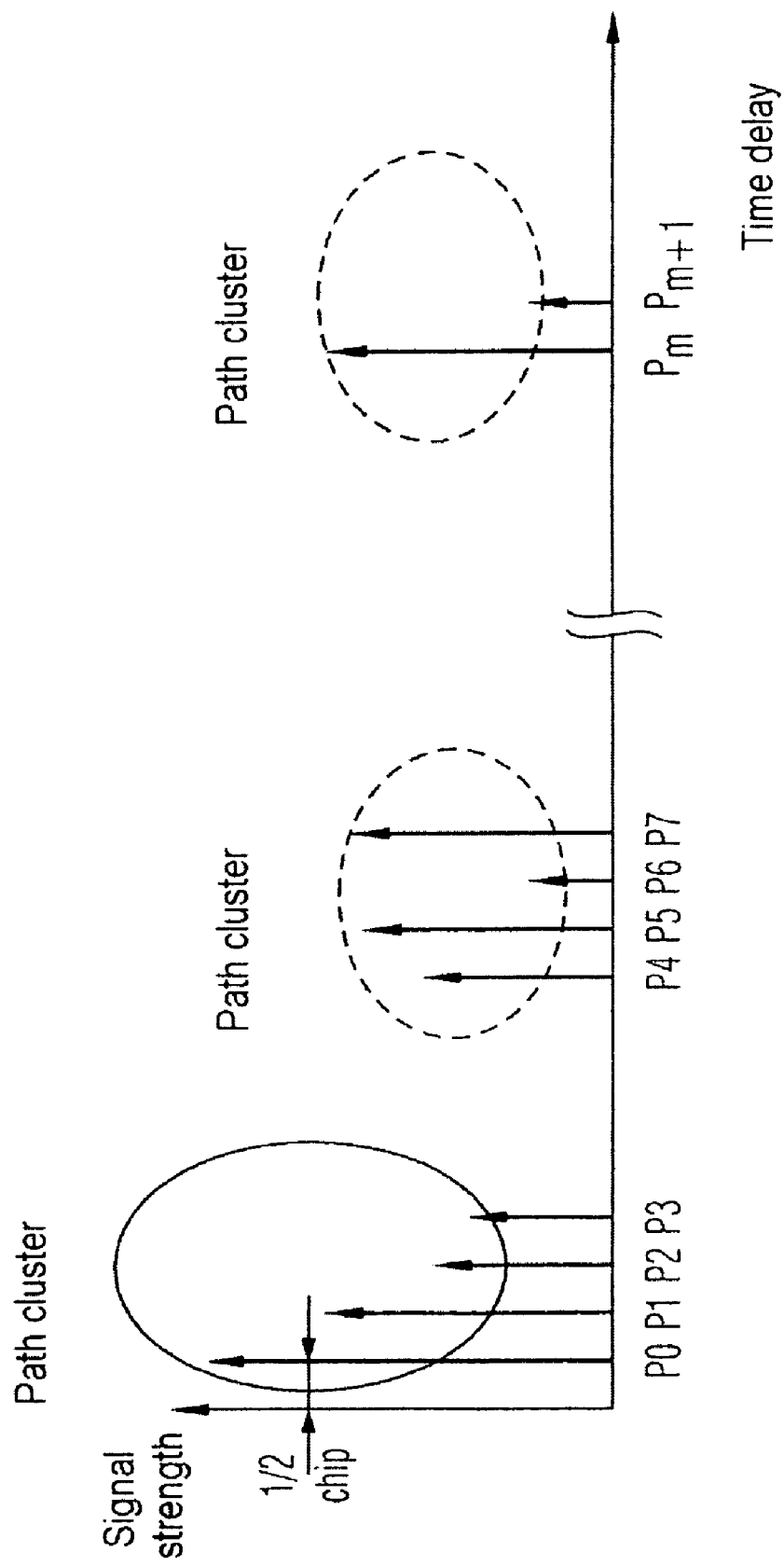

$M_1 = pwr(P0) + pwr(P2) + pwr(P4)$ $M_2 = pwr(P0) + pwr(P2)$ $M_5 = pwr(P1) + pwr(P3)$ $M_3 = pwr(P0) + pwr(P3)$ $M_6 = pwr(P1) + pwr(P4)$ $M_4 = pwr(P0) + pwr(P4)$ $M_7 = pwr(P2) + pwr(P4)$

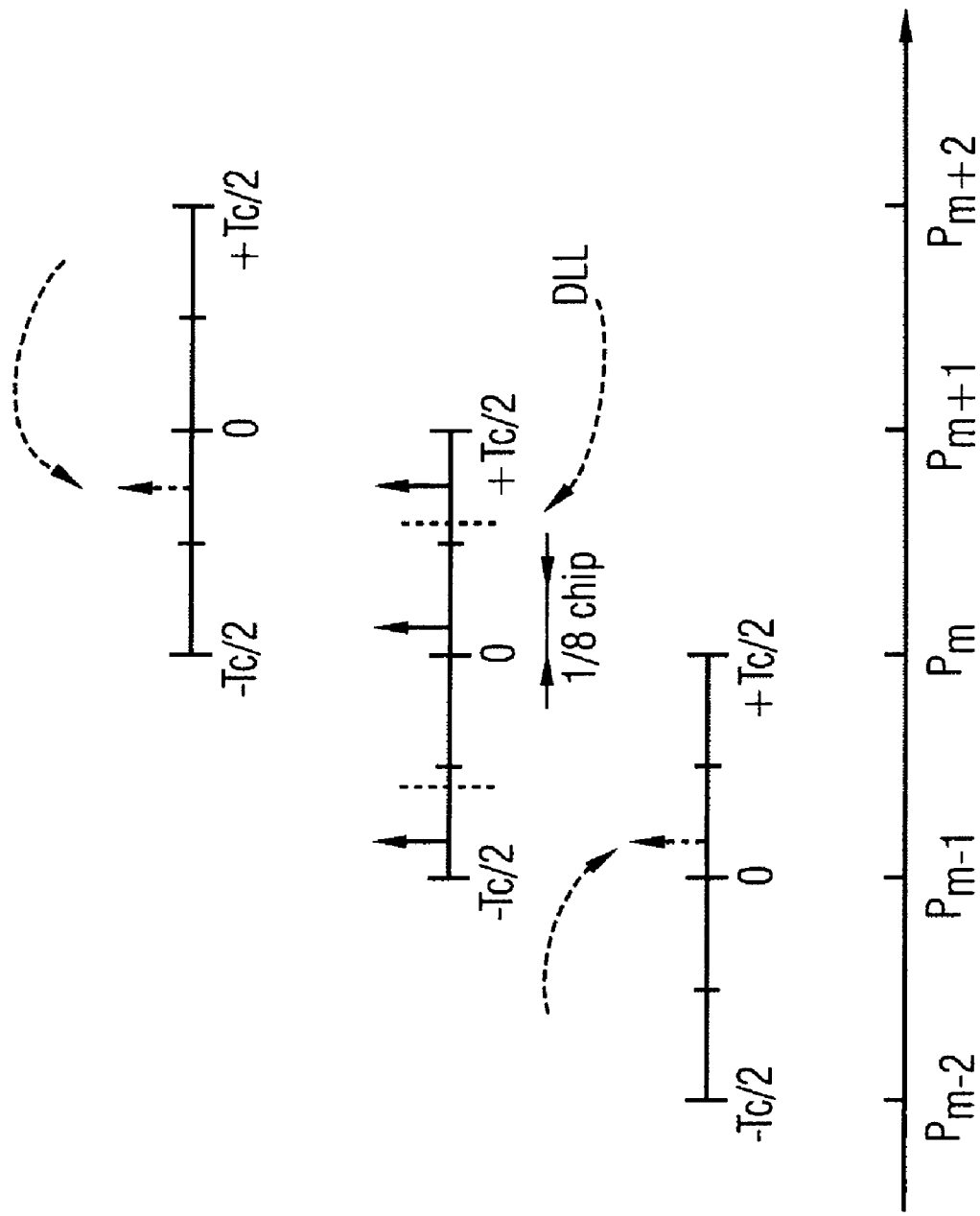

RG = Frame boundary
PDP = Path delay profile
FA = Finger allocation
T = Task

DETERMINATION AND SELECTION OF TRANSMISSION PATHS AS A FUNCTION OF THE OPERATING SITUATION FOR SETTING UP RAKE FINGERS FOR RAKE RECEIVER UNITS IN MOBILE COMMUNICATION TERMINALS

REFERENCE TO RELATED APPLICATIONS

This application claims the benefit of the priority date of German application DE 103 45 959.6, filed on Oct. 2, 2003, the contents of which are herein incorporated by reference in their entirety.

FIELD OF THE INVENTION

The present invention relates generally to communication mechanisms and, more particularly, to methods for determination and selection of transmission paths and setting up rake fingers in a rake receiver on the basis of the selected transmission paths.

BACKGROUND OF THE INVENTION

In a mobile radio, radio signals are subject to multipath propagation, that is to say a number of versions of the received signal occur in the receiver as a result of reflection, scatter and diffraction of the transmitted radio signal on various obstructions in the transmission path and these versions are shifted in time with respect to one another, and have different attenuations. The method of operation of a rake receiver is based on the idea of the received signal versions which have the highest energy being evaluated separately in rake fingers, and then being superimposed with the correct timings. Each rake finger has an associated path delay, and the oversampled, digitized received signal values, which are stored in a RAM input memory, are input into the rake finger with a delay corresponding to the path delay. In addition, the rake finger has an interpolator for varying the sampling clock rate and thus for fine adjustment to the time delay, with an error signal being supplied to the interpolator from an early/late correlator.

Before the rake fingers in the rake receiver circuit can be set up, a delay time estimate is made, in order to obtain a signal power delay profile (pdp) in which the received signal power is plotted continuously against the delay time, and from which the various propagation paths and the associated delay times can be taken. Pilot symbols (common or dedicated pilot symbols) are transmitted at the transmitter end for this delay time estimate, and the received pilot symbols can be evaluated by correlations with the pilot symbols that are known to the receiver. In this case, at least one product correlation sequence comprising a scrambling code, channelization code and the pilot symbols is used in the receiver. The propagation paths which can be drawn from the power delay profile are then also subjected to a suitable selection process and, finally, are passed to the various rake fingers.

By way of example, FIG. 1 shows an apparatus, which operates on this principle and has a rake receiver and devices for determination and selection of the transmission paths. The sampled and digitized received signal values are supplied to a pulse-shaping filter 1, for example, a root cosine filter and are then supplied not only to a rake receiver 5 but also to a delay time estimator 2. A power delay profile $pdp_{est}(k)$ is determined in the delay time estimator 2 by means of correlation procedures and, possibly, further averaging processes. This power delay profile $pdp_{est}(k)$ is supplied to a path detection and selection unit 3, in which the strongest paths are determined, and those paths which can be assigned to the rake fingers are selected from them. These selected paths are transmitted to a finger allocation unit 4 in which the paths are allocated to specific rake fingers, on the basis of their path position, that is to say their delay time and their signal strength, that is to say their path weight. The finger allocation unit 4 transmits appropriate information about the allocation process between the paths and the rake fingers to the rake receiver 5, which has a number N of rake fingers 5.1 ... 5.N, in which the received signal values produced by the pulse shaping filter 1 have appropriate delay times added to them, and are then demodulated. The various delay times in the rake fingers are indicated in the drawing by a spatial offset (which increases in decreasing sequence) for the boxes associated with the rake fingers. The demodulated output signals from the rake fingers 5.1 ... 5.N are supplied to an adder 6, in which, for example, maximum ratio combining (MRC) is carried out. The signal components received via the various transmission paths are superimposed again, with the correct timings, in the adder 6, and a soft output data symbol is emitted from the adder 6.

Since the transmission paths between the transmitter and receiver can change very quickly, the delay time estimation and finger allocation have to react sufficiently quickly to avoid any loss of relevant paths. At the same time it is necessary to ensure that only the most or more relevant paths are processed in the rake receiver for each time, since the rake receiver has only a restricted number of rake fingers. On the one hand, it is generally necessary to minimize the probability of the rake fingers having excessively noisy transmission paths applied to them while, on the other hand, it is generally necessary to minimize the probability of useable transmission paths with low noise not being detected.

In the past, it has been known for a power delay profile to be created in a receiver circuit having a rake receiver section, for the local maxima in this delay profile to be determined, and for a number of relevant transmission paths to be selected from these local maxima. However, the previously known methods for delay time estimation and path selection have ignored the instantaneous operating situation, in particular the relative speed between the transmitter and receiver, the frequency offset and the noise level. The correlation and averaging procedures to be carried out in the receiver, as well as the subsequent path selection are, according to the known method, carried out using fixed parameters independently of the respective operating situation. Major parameters are, for example, the correlation length, that is to say the length of successive pilot symbols which are correlated with the received signal in the receiver, the number of correlation results over which the averaging process is carried out, and the number of delay profiles on which further evaluations, such as selections, are carried out. If these parameters are set to fixed values, then this leads to noisy delay profile estimates, or delay profile estimates that are subject to errors, and, as a consequence of this, to incorrect allocations of rake fingers with unusable transmission paths, or to allocations of usable transmission paths which are not feasible.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later. Accordingly, one object of the present invention is to specify a method for determination and selection of transmission paths in a mobile communication terminal, which can be carried out more flexibly, so that the relevant transmission paths can be determined with more objective accuracy.

The present invention facilitates determination and selection of transmission paths in a mobile communication terminal. Additionally, the present invention also facilitates setting up rake fingers in a rake receiver unit for a receiver circuit in a mobile communication terminal on the basis of the selected transmission paths.

In accordance with an aspect of the present invention, a method is provided, in which rake fingers in a rake receiver circuit can be set up on the basis of selected transmission paths. An apparatus for carrying out the methods is likewise specified.

In accordance with another aspect of the present invention, a method for correlation processes are carried out between the received signal, to which pilot symbols have been applied at the transmitter end, and a correlation signal which contains the pilot symbols, such that a delay profile is produced. Averaging processes are then carried out over each of a number of delay profiles obtained in this way, and two or more averaged delay profiles are evaluated in each case with the aim of final path selection. One idea of the invention is now to set up the parameters which govern the correlation processes, and/or the averaging processes and/or the evaluations and/or to set up the repetition interval of these calculations, as a function of the relative speed between the transmitter and receiver, the frequency discrepancy between the carrier frequency of the received signal and the reference frequency, which is set at the receiving end, and the noise level of the received signal.

This measure makes it possible to take better account of the actual conditions for mobile radio transmission, so that the relevant transmission paths can be determined more realistically and in a shorter time. In this case, in particular, the invention provides for the capability to set up all of the parameters that have been mentioned above such that they are variable, and for the relative speed, the frequency discrepancy and the noise level to be determined continuously or at time intervals and for the parameters to be set as a function of the measured values.

In another aspect of the present invention, the following parameters can be regarded as governing parameters for the correlation processes, averaging processes and evaluations to be carried out.

When determining the delay profile, correlation processes are first of all carried out on the basis of pilot symbols. In this case, a number of pilot symbols are transmitted at the transmitter end in each time slot, and these known pilot symbols are correlated at the receiver end with the received signal. These may be pilot symbols which are transmitted as general pilot symbols (common pilot) in a dedicated channel, or as dedicated pilot symbols (dedicated pilots) periodically, that is to say in each time slot, being inserted as a cohesive sequence into the actual payload data signal for a specific receiver. In any case, it is possible to use the complete sequence of pilot symbols transmitted in one time slot for correlation in the receiver or to use only a number of successive pilot symbols from the total number for this purpose. The parameter that governs the correlation processes is thus the correlation length $N_{CORR}$, which is formed from a number of successive pilot symbols. As has already been explained above, a product correlation sequence composed of a scrambling code, a channelization code and the number of successive pilot symbols is formed in this case, and is correlated with the received signal.

In this case, correlation values are calculated for all possible time differences between the sample values and the local correlation sequence. By way of example, reference is made to German Patent Application 102 41 693.1, which is hereby included in the disclosure content of the present application. This document describes the digitized received signal values, which are stored in a buffer store, being read in the successive correlation runs with incrementally rising start times.

An averaging process is then carried out over the correlation results, based on the assumption that the correlation described above, from which a delay profile is obtained, is carried out two or more times, and that an averaging process is carried out over the delay profiles. The parameter which governs the averaging processes is in this case the number $N_{avg}$ of correlation results to be averaged.

The averaging process results in an averaged channel delay profile, on which further evaluations can now be carried out, with regard to suitable selection of relevant transmission paths. These evaluations are carried out in such a way that a number $N_{avg\,fading}$ of averaged delay profiles are produced by means of the correlation and averaging procedures described above. These $N_{avg}$ delay profiles may be used, for example, to make a selection by selecting those paths in which the signal value in at least a total of $N_{occ}$ of the $N_{avg\,fading}$ delay profiles exceeds a predetermined threshold value $N_{peak\,max}$.

A further parameter is the repetition interval RI, which indicates the interval in which the procedures mentioned above should be repeated for determination and selection of the paths.

It is possible for the parameters described above to be dependent on influencing variables including the relative speed, the frequency discrepancy and noise level, continuously, on the basis of a predetermined functionality. However, this would involve a relatively high degree of implementation complexity. On the other hand, it is simpler and sufficient for the purposes of the invention for the influencing variables including the relative speed, the frequency discrepancy and the noise level each to be subdivided on the basis of their magnitude into a finite number of areas, thus making it possible to produce a table of the values (defined in advance for each operating state) for the parameters $N_{CORR}$ $N_{avg}$, $N_{avg\,fading}$ and RI. For example, in the simplest case, the influencing variables can be subdivided into two areas, specifically high or low, thus resulting in a total of eight operating states, and predetermined values for the parameters for each of these eight operating states can be stored in the table.

If, as described above, a finite number of operating states are defined in advance, then it is also possible to provide for one operating state to be defined as a reference operating state, and for the parameters to be increased or decreased in a predetermined manner on the basis of specific parameter values for the reference operating state, whenever the operating state changes. In particular, this may mean that the increase or decrease is carried out only by specific amounts, so that three different values are in each case provided, de facto, for the parameters.

The influencing variables including relative speed, frequency discrepancy and noise level can be measured continuously or at specific predetermined time intervals by devices which are suitable for this purpose. If no measurement data for the influencing variables is available initially, then predetermined values can be used initially for the delay time estimation parameters, for example those which correspond to one of the predefined operating states, such as the reference operating state. When the first measurement data subsequently becomes available from the measurement devices mentioned above, the procedure as described above can be used whenever an operating state change occurs.

After the evaluation as described above, on the basis of the $N_{avg\ fading}$ delay profiles and the path selection processes which result from this, it is also possible to carry out a further path selection process. Specifically, suitable predetermined assessment criteria can be used to determine the occurrence of groups or clusters of transmission paths in the delay profile, for example, a preset of a minimum number of paths within a predetermined maximum time window. It is then possible to make just a limited selection of paths from the path group, from each such path group that is found. This selection may, for example, be carried out by predetermining a number of paths to be selected and a minimum interval between the delay times of adjacent paths, and by selecting that one of the possible path configurations which has the highest total signal strength. The chip duration $T_C$, in particular may be chosen as the minimum interval between adjacent paths.

Methods in accordance with the present invention are suitable both for use in a mobile communication terminal and in a base station. Furthermore, with regard to use in a mobile terminal, the UMTS Standard provides for received signals to be received and demodulated by two or more base stations. The group of base stations that is currently used by the mobile terminal is also referred to as the active set, while the group of base stations which are only monitored and which are candidates for the active set are referred to as the monitor set. In the situation where two or more base stations are currently being used, it is possible first of all to separately determine and select transmission paths for each base station using the method according to the invention as specified above, and then to select a minimum number of transmission paths in the selection process that is carried out subsequently by each base station and, finally, to select a remaining number of transmission paths in the sequence of their SINR weight—independently of the base station. In this case, the SINR weight means the signal amplitude minus the mean noise level, and the SINR weight is calculated in this way.

The methods according to the invention as described above allow the rake fingers in a rake receiver unit for a receiver circuit in a mobile communication terminal to be set up with the selected transmission paths and the respectively associated path delay times and path weights. In this case, the signal amplitudes of the selected transmission paths may be used as a measure of the path weight to be transmitted to the rake receiver unit. In principle, the invention may be used not only in a mobile station but also in a base station.

As already mentioned, sampling time error can be detected from the received and sampled signal sequence in each rake finger, and a corresponding error signal can be produced, with the sampling clock rate or the sampling time for the signal sequence being varied as a function of the error signal, thus resulting in fine adjustment of the time delay in the rake finger. Reference is made by way of example, to German Patent Application 103 06 990.9, which is likewise included in the disclosure content of the present application. With regard to the formation of the error signal, it is possible for a received signal sequence to be correlated in each rake finger with a matching locally produced signal sequence relating to an earlier and a later point in time, and for the error signal to be formed from the correlation signals. The sampling clock rate is preferably varied by interpolation of data values in the signal sequence, for example, in a time-variant interpolator (TVI), using the error signal.

Since this measure is preferably carried out in all of the rake fingers, it is possible for two rake fingers which originally had two sufficiently separated delay times to become too close or even for their delay times, which result from the correction process described above, to match. In order to detect this, it is possible to provide for the changes in the sampling clock rates which are provided in the rake fingers on the basis of the error signals to be detected, and for one of two rake fingers to be switched off or to be removed from the selected paths, if the difference between their path delay times, as changed by the changed sampling clock rates, is zero or falls below a predetermined threshold value.

Furthermore, it is possible to provide for the delay time of the rake finger to be shifted forwards or back-wards by a predetermined time period, for example half the chip duration, if the magnitude of the error signal is greater than a predetermined maximum value.

In accordance with another aspect of the present invention, an apparatus for carrying out a method of selecting transmission paths and setting up rake fingers contains a path determination unit for determination of the transmission paths of the received signal and of the associated path delay times and path weights, and for carrying out the correlations and averaging processes. The apparatus also has a threshold value selection unit for selection of those delay times as paths for which the signal value in at least a number $N_{OCC}$ of the $N_{avg\ fading}$ averaged delay profiles exceeds a predetermined threshold value $N_{peak\_max}$. The apparatus likewise has a parameter determination unit which is connected to the path determination unit and possibly to the threshold value selection unit and to which a relative speed estimator, a frequency error estimator and a noise level estimator are connected and which set the parameters which govern the correlations, the averaging processes and evaluations from the variables supplied for the relative speed, the frequency error and the noise level and passes these parameters to the path determination unit.

The apparatus may furthermore have a path selection unit, which is connected to the threshold value selection unit and is designed to detect groups or clusters of transmission paths in the delay profile on the basis of predetermined assessment criteria, and to make a selection of paths from these groups.

In accordance with yet another aspect of the present invention, an apparatus which is contained in a mobile terminal has a common path determination unit and in each case has a corresponding number of units as mentioned above corresponding to the number of currently used base stations or else antennas of one or more base stations, with the common path determination unit being connected to each of the threshold value selection units. An apparatus such as this furthermore has a common finger allocation unit, which is connected to each of the path selection units and is designed such that it selects a minimum number of transmission paths from each base station, and selects a remaining number of transmission paths in the order of their signal power. In this case, the finger allocation unit may be connected to an SINR estimator for estimation of the mean signal-to-interference-and-noise (SINR) ratio and, furthermore may be designed such that it calculates the SINR weight of the transmission paths by means of their signal amplitude minus the mean noise level of the received signals which have been transmitted from the relevant base station.

In accordance with another aspect of the present invention, a rake receiver unit for a receiver circuit in a mobile communication terminal which has a number of rake fingers and an apparatus for carrying out path selection and setting the rake fingers is provided. In this case, it is possible in a manner known per se for only one rake finger to be in the form of hardware, and to be operated in the multiplex mode.

The rake fingers in the rake receiver unit mentioned above may have associated sampling time correction means, which correct the sampling time of the signal sequence, which is received and sampled in the rake fingers, on the basis of the detected sampling time error, and which are connected to the path selection unit. In this case, the path selection unit is designed such that one of two rake fingers can be disconnected or can be removed from a path selection which has been supplied from the threshold value selection unit when the difference between its path delay times, which have been changed by the changed sampling clock rates, is zero or is less than a predetermined threshold value.

The sampling time correction means may be formed by an interpolator, in particular a time variant interpolator (TVI).

BRIEF DESCRIPTION OF THE DRAWINGS

The invention will be explained in more detail in the following text with reference to exemplary embodiments and in conjunction with the drawing figures, in which:

FIG. 3 shows a theoretical delay profile with path clusters in accordance with an aspect of the present invention.

FIG. 6 shows a schematic illustration of finger repositioning as a result of sampling time error estimation and correction in accordance with an aspect of the present invention.

DETAILED DESCRIPTION OF THE INVENTION

The present invention will now be described with respect to the accompanying drawings in which like numbered elements represent like parts. The figures provided herewith and the accompanying description of the figures are merely provided for illustrative purposes. One of ordinary skill in the art should realize, based on the instant description, other implementations and methods for fabricating the devices and structures illustrated in the figures and in the following description.

Figure 1:
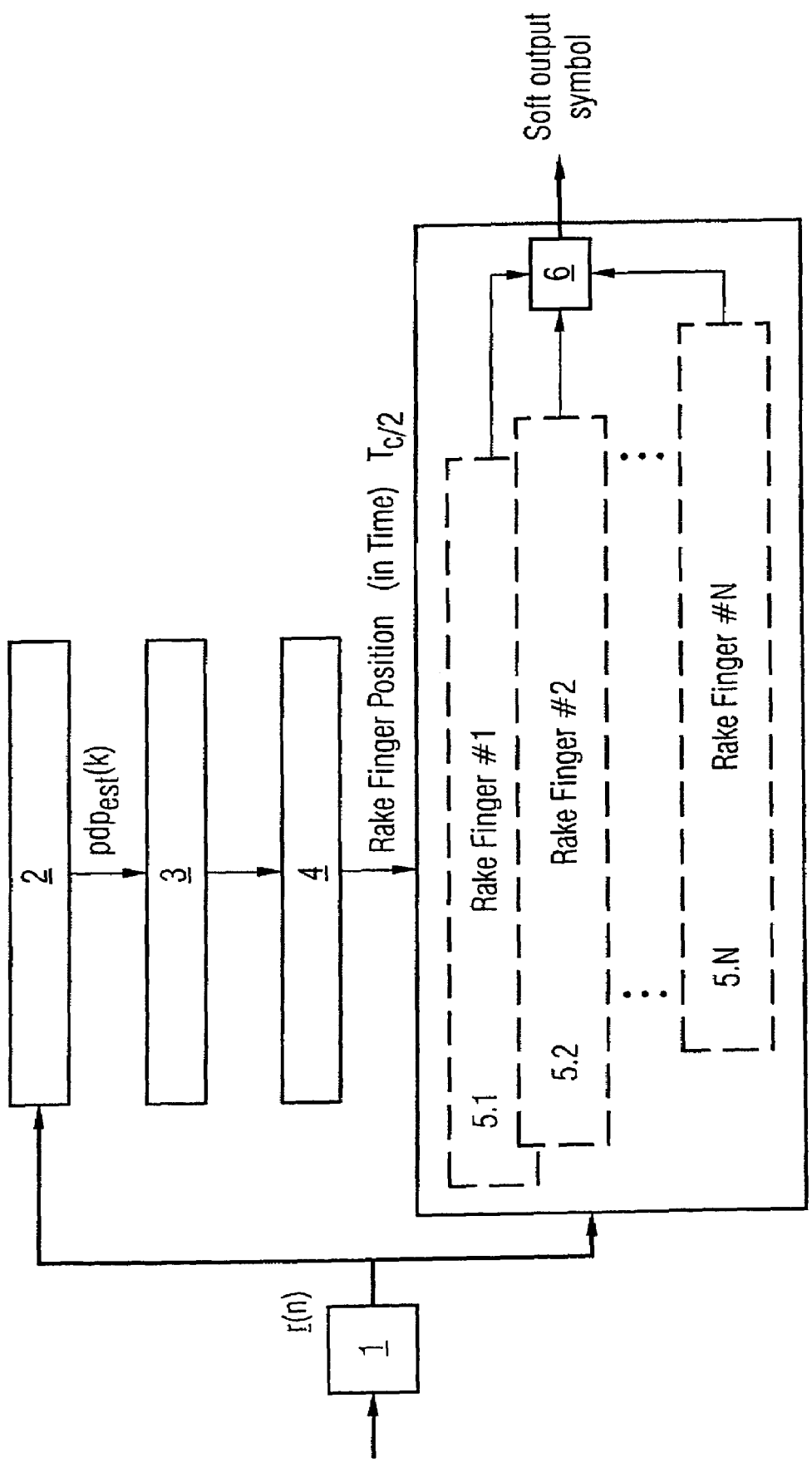
FIG. 1 shows an apparatus with rake receiver units for delay time estimation according to the prior art.
Figure 2:
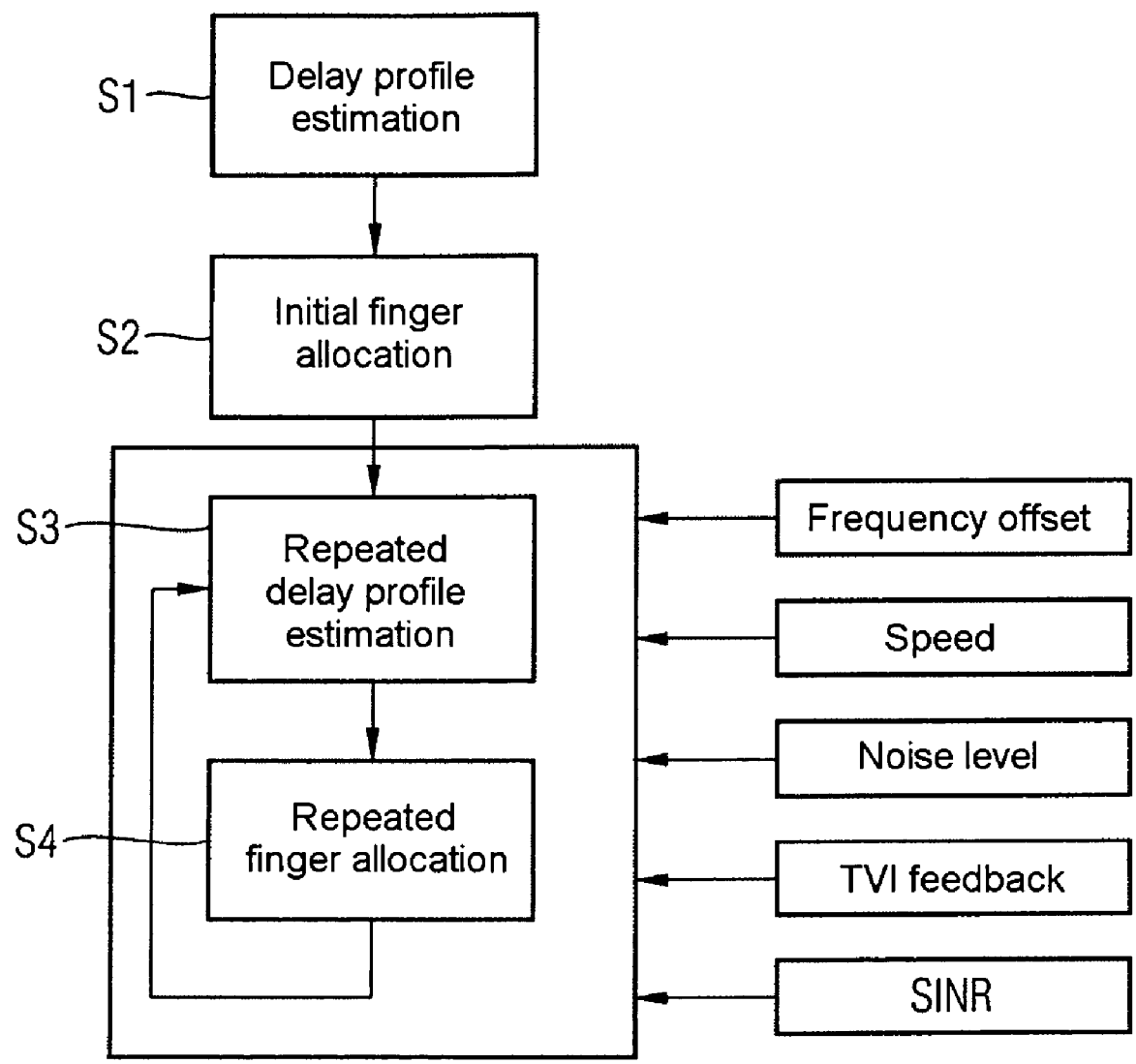
FIG. 2 shows an exemplary embodiment of a method according to an aspect of the present invention, in the form of a schematic flowchart.

By way of example and in the form of a schematic flowchart, FIG. 2 shows a method in accordance with the present invention. An initial delay profile estimation process is carried out in a step S1 in which no measurement variables are yet available for the influencing variables, also referred to as influencing parameters, comprising the relative speed, frequency discrepancy and noise level. The delay profile estimation process is therefore carried out using preset values for the parameters for the correlations, averaging process and evaluation. These preset values may be the parameters of one of the operating states, in particular of the reference operating state, which will be described in more detail further below.

An initial finger allocation process can then be carried out in step S2 on the basis of the delay profile determined in step S1, in which the selected paths are set to $N_{FINGER}$ with a minimum delay time interval $T_{min}$ and a resolution $T_{c/2}$.

The other steps are based on the assumption that measurement results are available for the relative speed, frequency error and noise level, so that another delay profile estimation process is carried out in step S3, in which, if required, the parameters for the correlation processes, the averaging processes and the evaluations are adapted as a function of the measured and supplied influencing variables. Another finger allocation process is carried out in step S4, on the basis of the paths selected in step S3. A feedback signal of the time variant interpolator TVI is now additionally used in this process, by means of which it is possible to indicate that two rake fingers have the same corrected delay times, or that their time difference is less than a specific threshold value. Thus, in step S4, not only is another finger allocation process carried out as in step S2, but superfluous fingers are also disconnected by means of the TVI feedback signal, are removed from the selected path selection, or are replaced by other fingers. Furthermore, the TVI feedback signal is used as the basis for shifting fingers through a delay time of $T_{c/2}$ in the positive or negative direction if the error signal which results from the early/late correlation is greater than a specific maximum value. Furthermore, an SINR signal is used in step S4 in order to carry out the path selection process from the base stations as a function of the SINR level of the signals from the base stations when signals from two or more base stations are being demodulated in one mobile station.

After a repetition interval RI, the method procedure returns to step S3, so that another delay profile estimation process is carried out on the basis of updated values for the frequency offset, the speed and the noise level and another finger allocation process is then carried out once again in step S4, on the basis of new TVI feedback signals and new SINR values.

The relative speed between the transmitter and receiver can be estimated in a manner known per se by means of speed estimators, for example by evaluation of Doppler shifts. The adaptation of the parameters on the basis of the speed estimation takes suitable account of fading variations. If the speed is low, the time between successive delay time estimates must be increased, in order to average out the long fading phases. This can be achieved by carrying out the delay time estimation processes in an interleaved manner with the received signals from various base stations. During a soft handover procedure for measurement purposes, a number of base stations must be observed in parallel, in accordance with the 3GPP requirements.

In the case of high speed, the averaging should be shorter, since the environmental conditions and the path position can change very quickly. In the worst case, a path could drift by about half the chip duration in 560 ms for a mobile terminal speed of 250 km/h for a 3GPP-FDD system. Furthermore, in some areas, there is an increased probability of paths disappearing and reappearing at different points within very short time intervals (see the propagation channel definition in the 3GPP Standard).

The frequency offset estimator which is used for the method provides a frequency discrepancy value between the carrier frequency of the received signal and the reference frequency which is used in the receiver. This frequency discrepancy can be used to produce a path drift, which is not always negligible. For example, a discrepancy of half the chip period can occur in 130 ms for a 1 part per million frequency discrepancy in a 3GPP-FDD system. The difference must be compensated for, but the correction accuracy also depends on the functional mode being used. It is assumed that the frequency offset in a mode connected to a transmission station is low in the case of UMTS-FDD (since, for example, the uplink connection for the base station is active for a mobile station), but if the mobile station is only observing adjacent cells, the frequency error conditions are not particularly stringent. In some cases, the influence of the frequency offset must therefore be considered. In particular, the correlation length must be adapted, since the coherent integration produces an optimum result only provided that it can be assumed that the phase of the input signal has not been shifted excessively with respect to the correlation sequence. Long correlation lengths in a situation with high frequency discrepancies must therefore be avoided. The averaging process must likewise be adapted, in order to keep step with the path drift rate.

Theoretical investigations and simulations can be carried out in order to define a set of parameters for a pair of scenarios, which are stored in a databank for the dynamic configuration of the receiving circuit according to the invention. For implementation reasons, only a limited number of scenarios can be provided, corresponding to predetermined criteria. The estimators which have already been mentioned can then be used to characterize the operating situation, from which the operating state which corresponds to this scenario is selected, and the appropriate set of parameters are produced.

The processing of the finger allocation can take account of the following influences:

the number of base stations which are demodulated simultaneously during a soft handover procedure, propagation conditions; noise level and relative speed, system requirements relating to the minimum time period between two PDP estimates for a given cell, in order to avoid major discrepancies (path losses) from one estimation process to another, resource splitting of blocks between different functions of the 3GPP modem (demodulation activities for some cells, measurement tasks, ... ).

The processing algorithm then can adapt the task time duration, the parameters and the frequency on the basis of all of this information. Those parameters that can be matched to the respective scenario with respect to the finger allocations for the delay time estimation and path determination processes are:

$N_{CORR}$: length of the coherent correlation (correlation length), indicated by the number of successive pilot symbols used, $N_{avg}$: number of results determined during the correlation process (delay profile or individual blocks of the delay profile) for non-coherent accumulation, $N_{avg\,fading}$: number of successive delay profiles which have been determined during the previous averaging process and have been taken into account for the path selection, $N_{OCC}$: number of the occurrence of given delay time positions after the previous selection process (after definition of a threshold value $N_{peak\_max}$), the noise threshold value is defined on the basis of the noise estimate, RI: the repetition interval, which indicates the period (stated in frames) between two successive calculations (delay profile and path selection) for a given cell; this variable depends on the channel rate of change.

The governing parameters may, for example, be set within the following limits:

| Parameter | $N_{CORR}$ | $N_{avg}$ | $N_{avg\,fading}$ | Repetition interval |
|---|---|---|---|---|
| Units and range | 1-10 symbols 256-2560 chips | 1-150 blocks | 1-32 | 1-10 frames |

With regard to the correlation length and when using the common pilot symbol corresponding to the lower limit, it is thus possible to use a single pilot symbol in the time slot, or else corresponding to the upper limit all ten pilot symbols which are transmitted at the transmitter end in that time slot. The correlation processes are generally carried out in blocks, so that the averaging process in the subsequent averaging step is carried out in blocks over the correlation results. The time period for this task corresponds to the integration of $N_{avg}$ blocks of length $N_{CORR}$. The number $N_{avg}$ of blocks varies between 1 and 150. The selection $N_{avg\,fading}$ of the delay profiles which is considered in the subsequent evaluation step for the path selection process varies between 1 and 32. The repetition interval for all of these calculations is between 1 and 10 frames (1 frame comprises 15 time slots in the UMTS Standard).

The dependency of the influencing variables on the parameters for the above calculations is illustrated by the following table. In this case, the influencing variables comprising the relative speed, frequency discrepancy and noise level are split into the two areas of high and low, thus resulting in eight operating states (scenarios). Scenario 1 may be defined as a reference scenario.

| Influencing variables | Low noise level | High noise level |
|---|---|---|
| Low speed and | Scenario 1: | Scenario 2: |
| Low frequency discrepancy | $N_{corr}$<br>$N_{avg}$<br>$N_{avg\,fading}$<br>RI | $N_{corr}$ ⇒<br>$N_{avg}$ ⇒<br>$N_{avg\,fading}$ ⇒<br>RI ≈ |
| Low speed and | Scenario 3: | Scenario 4: |
| High frequency discrepancy | $N_{corr}$ ◇<br>$N_{avg}$ ≈<br>$N_{avg\,fading}$ ≈<br>RI ◇ | $N_{corr}$ ◇<br>$N_{avg}$ ⇒<br>$N_{avg\,fading}$ ⇒<br>RI ◇ |
| High speed and | Scenario 5: | Scenario 6: |
| Low frequency discrepancy | $N_{corr}$ ◇<br>$N_{avg}$ ≈<br>$N_{avg\,fading}$ ◇<br>RI ◇ | $N_{corr}$ ≈<br>$N_{avg}$ ⇒<br>$N_{avg\,fading}$ ⇒<br>RI ◇ |
| High speed and | Scenario 7: | Scenario 8: |
| High frequency discrepancy | $N_{corr}$ ◇<br>$N_{avg}$ ≈<br>$N_{avg\,fading}$ ◇<br>RI ◇ | $N_{corr}$ ≈<br>$N_{avg}$ ⇒<br>$N_{avg\,fading}$ ≈<br>RI ◇ |

In this case, the symbols ⇒, ◇, ≈, indicate that that parameter value is increased, reduced or remains unchanged. The parameters may be increased or reduced in particular in standard, predefined steps. The parameter value $N_{OCC}$ is not mentioned in the table; this preferably changes in the same manner as the value for $N_{avg\,fading}$.

The noise threshold value can be adapted directly on the basis of the noise statistics:

$$NoiseThreshold = a \cdot \mu + b \cdot \sigma + c,$$

where $\mu$, $\sigma$ respectively denote the mean value and the standard deviation of the noise samples, and a, b and c are coefficients which can be defined by simulations.

The number of cells can likewise influence the definition of the scenarios and operating states, since the hardware/firmware resources which the cells of base stations share for the finger allocation process can reduce the time duration for the calculations for a given cell.

The following text describes a further method measure by means of which the number of rake fingers used can be reduced without adversely affecting the performance of the rake receiver. Situations are feasible in which some delay time positions in the delay time profile, which are separated from one another by at least half the chip period, have a sufficient signal strength in order to be associated with a rake finger. If no correction is introduced here, this can lead to allocation of superfluous rake fingers. The proposed method measure is based on the identification of path clusters, from each of which individual paths with the maximum total signal strength are selected.

FIG. 3 shows a delay time profile as could be produced, for example, after processing of the calculations described further above, that is to say delay time estimation and subsequent path selection. A number of path clusters k can be seen in this theoretical delay time profile. Suitable assessment criteria must be set up and stored for this purpose in advance, on the basis of which it is possible to determine unambiguously by calculation whether or not that path cluster is present. By way of example, it is possible to check whether there are a specific minimum number of paths within a specific predefined delay time interval. If it has been found that path clusters are present, then a selection of paths can be made from path clusters on the basis of a predetermined selection rule.

Figure 4A:
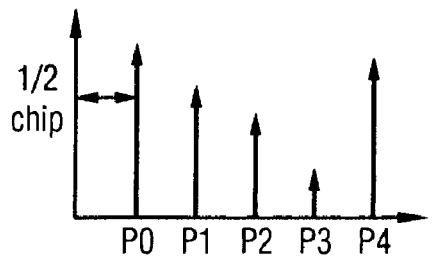
FIGS. 4a-h show a delay profile with a path cluster 4(a) and various selection configurations 4(b-h) in order to illustrate a selection process in accordance with an aspect of the present invention.

By way of example, a path may be selected from a path cluster by a predetermined minimum number of paths to be selected, and a minimum interval between them. This will be described in more detail with reference to FIGS. 4A to 4H. FIG. 4a shows a detail from a delay time profile, as a starting point, which comprises one path group comprising five paths P0-P4, which are each separated from one another by half the chip length.

Figure 4B:
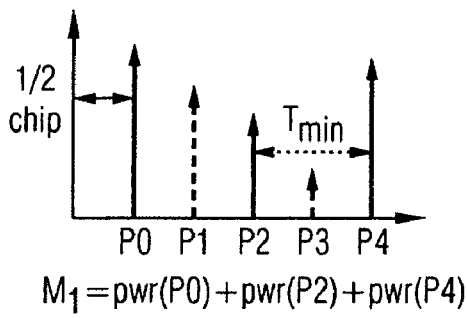
Figure 4C:
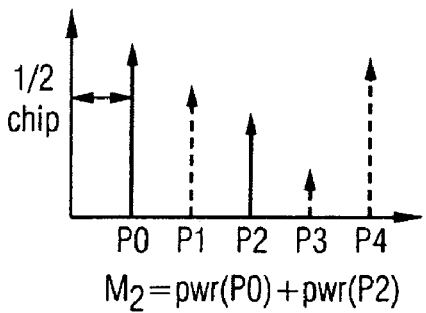
Figure 4D:
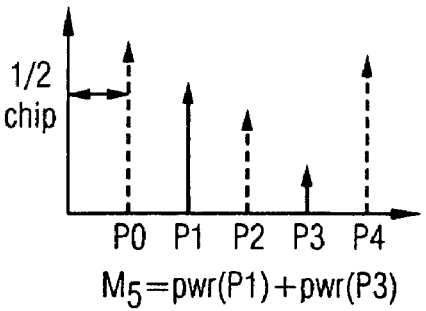
Figure 4E:
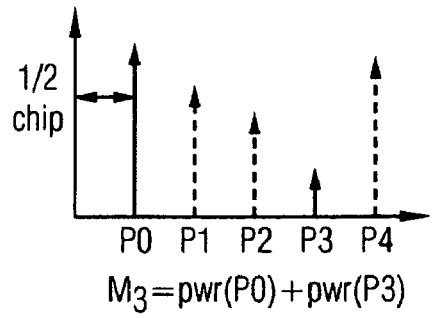
Figure 4F:
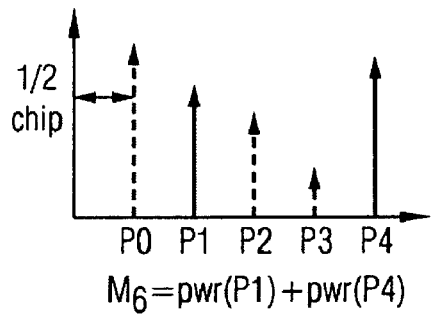
Figure 4G:
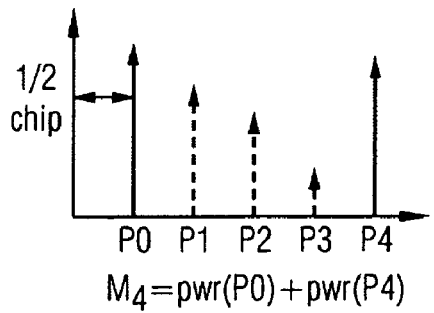
Figure 4H:
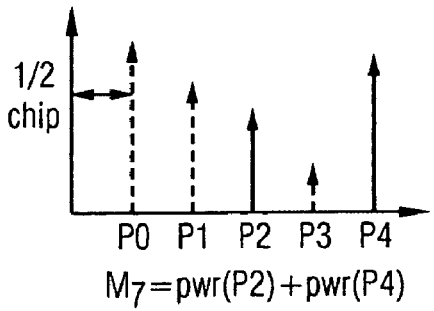

If, as a first option, a path selection is predetermined such that three, and only three, paths are intended to be selected, whose separation should be at least $T_{min}$, then this results in only one solution, which is illustrated in FIG. 4b and has the paths P0, P2 and P4 as the paths to be selected. The paths to be selected are shown by solid lines, while the rejected paths are shown by dashed lines.

As a second option for path selection, it is also possible to provide for two, and only two, paths to be selected whose minimum separation $T_{min}$ from one another is once again intended to be one entire chip period. The possible solution configurations are illustrated in FIGS. 4c-h. The solution configuration which is selected from these is that which produces the highest total signal strength of the selected paths. This relates to the configuration shown in FIG. 4g, since the addition of the signal amplitudes of the selected paths P0 and P4 produces the maximum total signal strength. Once again, the selected paths are shown by solid lines in each of the figures, and the rejected paths by dashed lines.

In order to further increase the efficiency of the proposed algorithm, it is also possible to provide an additional weighting for the individual paths corresponding to the intended sampling clock rate change, which is carried out in each rake finger on the basis of a detected sampling time error. However, in consequence, this means more complexity for the calculation of the selection metrics for the individual path configurations.

The above path selection process is carried out for each identified path cluster. The overall computation complexity depends not only on the number of identified path clusters but also on the number of paths on the individual path clusters.

Figure 5:
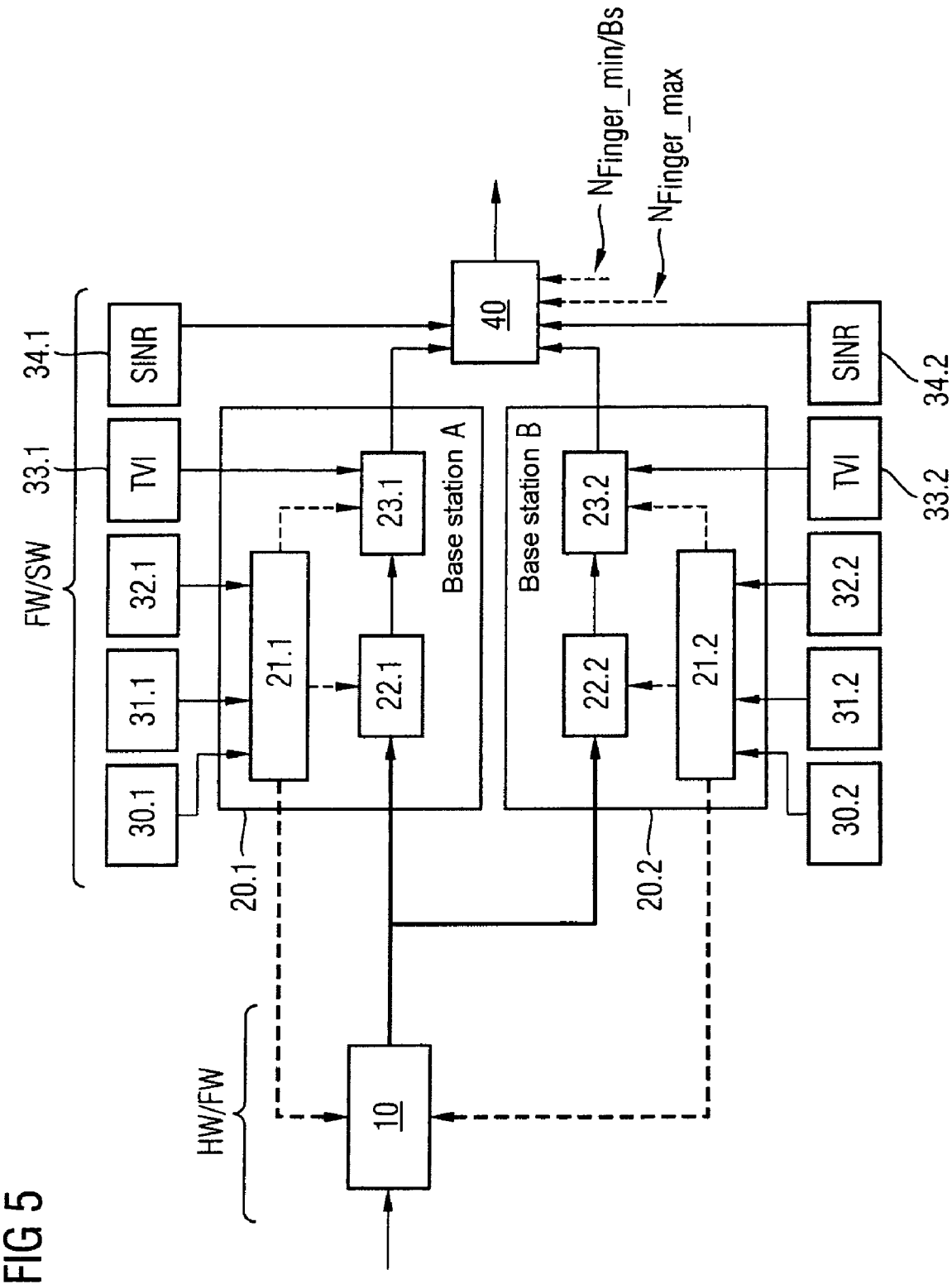
FIG. 5 shows a schematic illustration of an apparatus contained in a mobile station for delay time estimation and path selection with two base stations being used at that time in accordance with an aspect of the present invention.

An apparatus for carrying out the delay time estimation and path selection processes will be described in the following text with reference to FIG. 5, with this apparatus being contained in a mobile station and being able to process the received signals from two or more base stations, in particular for soft handover procedures.

The oversampled, digitized and pulse-shaped received signal values coming from a pulse shaping filter are supplied to a path determination unit 10, in which the transmission paths of the received signal and the associated path delay times and path weights for two base stations A and B are determined. The correlation and averaging processes are carried out in the path determination unit 10. The averaged delay time profiles are transferred, depending on their origin, from one of the base stations A and B to threshold value selection units 22.1 for the base station A and 22.2 for the base station B, in which the evaluations are carried out, in which, as described above, the paths are selected as those delay times for which the signal value in at least a number $N_{OCC}$ of the $N_{avg\_fading}$ averaged delay profiles exceeds a predetermined threshold value $N_{peak\_max}$.

A parameter determination unit 21.1 and 21.2 is provided for each of the base stations A and B and is used to determine (from the values supplied for the relative speed, the frequency discrepancy and the noise level) the parameters which govern the correlation processes, the averaging processes and the evaluations, and these parameters are transferred to the path determination unit 10. In this case, the relative speed is the mobile station's own speed, and is in each case estimated in the speed estimators 30.1 and 30.2, which are connected to the respective parameter determination units 21.1 and 21.2. A single speed estimator may also be provided instead of this. Frequency discrepancy estimators 31.1 and 31.2 as well as noise level estimators 32.1 and 32.2 are likewise respectively connected to one of the two associated parameter determination units 21.1 and 21.2.

Furthermore, each base station also has a path selection unit 23.1 or 23.2, respectively, which is connected to the respective threshold value selection unit 22.1 or 22.2, and is designed to detect groups or clusters of transmission paths in the path selection process (transmitted from the threshold value selection unit) on the basis of predetermined assessment criteria, and for which paths can be selected from a path cluster in the manner described above in conjunction with FIG. 4. Furthermore, each of the path selection units 23.1 and 23.2 is connected to the respective time variant interpolators (TVI) 33.1 and 33.2 which are associated with the relevant base station and which compensate for sampling time errors in each rake finger by changes to the sampling rate. It is also possible to provide one interpolator or one interpolator for each base station, which are operated in the multiplex mode, corresponding to the number of fingers. The interpolators supply the sampling rate change signal to the respective path selection unit 23.1 or 23.2, in response to which this disconnects a rake finger or removes it from the path selection, if it finds that the delay times of two rake fingers are too close to one another.

The final path selection is transferred from each of the path selection units 23.1 and 23.2 to a common finger allocation unit 40. The finger allocation unit 40 is thus designed such that it first of all selects a minimum number, preferably of the strongest signal paths in each case, from the paths which have been selected from each base station, and then selects the number of paths that are still available, in the sequence of their signal power, selectively from one of the two base stations. For this purpose, a parameter $N_{Finger\_min/Bs}$ is transferred to the common finger allocation unit 40 as the minimum number of paths from each base station, along with a parameter $N_{Finger\_max}$ which indicates the maximum number of fingers available in the rake receiver. The output signal from the common finger allocation unit 40 is passed to a rake monitoring unit.

Furthermore, the common finger allocation unit 40 is connected to SINR estimators 34.1 and 34.2 for each base station A and B, in which the signal-to-interference-and-noise ratio (SINR) is estimated in a suitable manner, for which purpose methods with which those skilled in the art will be familiar have been described in the prior art. The common finger allocation unit 40 uses the SINR values that have been supplied, in order to subtract these from the signal amplitudes from the remaining number of transmitting paths, and in this way to determine the signal power of these paths.

FIG. 6 shows, schematically, the finger repositioning mechanism based on a feedback signal on the time variant interpolator TVI, or the circuit which is connected to it. This is intended to avoid fingers in the rake receiver being separated from one another by half the chip period or less, since this does not result in any additional diversity gain in the MRC unit (maximum ratio combining). The output signal from the TVI can be checked by various fingers for this purpose, in order to determine whether different fingers are located at the same delay time position or are only slightly separated from one another.

The time error which is detected in the early/late correlation process may vary in a range [−Tc/2, +Tc/2]. A threshold value is defined for the sampling time error, above which the sampling time error is no longer compensated for by the interpolation. Instead of this, the finger position is reduced or increased by half the chip period, depending on whether the sampling time error exceeds the predetermined threshold value in the positive or negative direction.

FIG. 6 illustrates the situation, on the basis of three paths A, B and C, which are nominally intended to be located at the positions $P_{m-1}$, $P_m$, and $P_{m+1}$. The sampling time error measurements carried out in the associated rake fingers, indicate that all three rake fingers have sampling time errors which lead to the three paths being located within the interval [−Tc/2, +Tc/2] for the central path B. In addition, the threshold value range of the sampling time error as determined by the delay locked loop within which sampling time correction is still carried out is also shown, by dashed lines, in the interval associated with the central path B.

The use, as already mentioned in conjunction with FIG. 5, of two or more base stations in a mobile radio, will be described in somewhat more detail in the following text.

This situation occurs in particular during a soft handover procedure, in which two or more base stations have to be demodulated in the rake receiver unit in the mobile radio receiver. If the finger allocation process, as described in FIG. 5, were initially carried out independently for each connection to a base station, then it would be highly probable that too many fingers would be placed. The following rules should thus be defined:

all of the detected paths are used to select the best paths independently of their base station, so that the energy in the rake receiver can be maximized, a minimum number of paths for each base station is defined, in order to ensure that all of the base stations in the active set are observed correctly.

Otherwise, the number of paths per base station must be defined on the basis of their contribution, which can be obtained for the MRC unit. This depends on the SINR ratio of each selected path. Since the interference level for each path may differ, the comparison should be carried out with respect to the SINR value, and not only with respect to the absolute power. The SINR ratio is measured for each path and for each time slot during the downlink power monitoring procedure, and makes it possible to regulate the power emitted from the base station in the direction of a given mobile station. Since this information is available, it is possible to obtain a quality measurement of the connection for each finger.

Each finger allocation process results in a set of possible paths. If the index i is used to denote the power in rising order and the index k is used to denote the base station, then the paths can be denoted using the following notation:

$Spath_i^k = \langle Spath\_strength_i^k, Spath\_position_i^k \rangle$.

This procedure can then be defined as follows:
a number $N_{BS}$ (the number of received base stations in the active set) of rake fingers is first of all allocated to each of the best selected paths for each cell, so that these paths can be denoted by $Spath_i^k$ where k=1, 2, . . . $N_{BS}$.
The remaining rake fingers are allocated on the basis of an SINR criterion, using all of the selected paths for all of the base stations. This may be the difference between the path signal power, that is to say the signal amplitude, and an estimate of the SINR noise level.

$Npath_i^k = Spath_i^k - NoiseLevel_k$ where i=2 . . . $N_{paths(k)}$ and k=1, 2 . . . $N_{BS}$ The noise level is assumed to be the same for all the paths which originate from a given cell, but may vary between different cells. The noise estimate can be obtained using the absolute noise threshold value, as mentioned further above and which is calculated using the same parameters for all of the cells.

The calculated SINR value may likewise be used directly as the path selection criterion between different cells for all of the paths.

$Npath_i^k = SINR_i^k$ where i=2 . . . $N_{paths(k)}$ and k=1,2, . . . $N_{BS}$

Figure 7A:
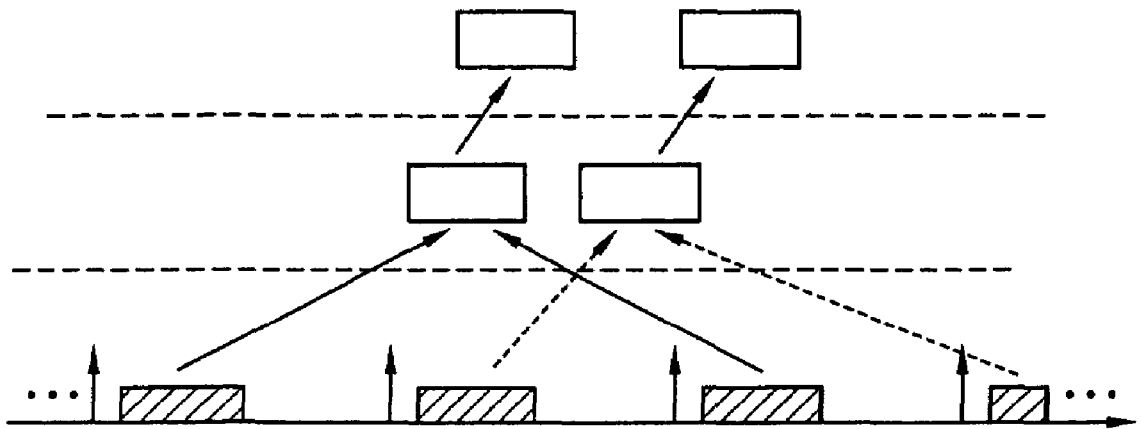
FIGS. 7A and 7B show a schematic illustration of two scenarios relating to the use of a method in accordance with an aspect of the present invention for two cells.
Figure 7B:
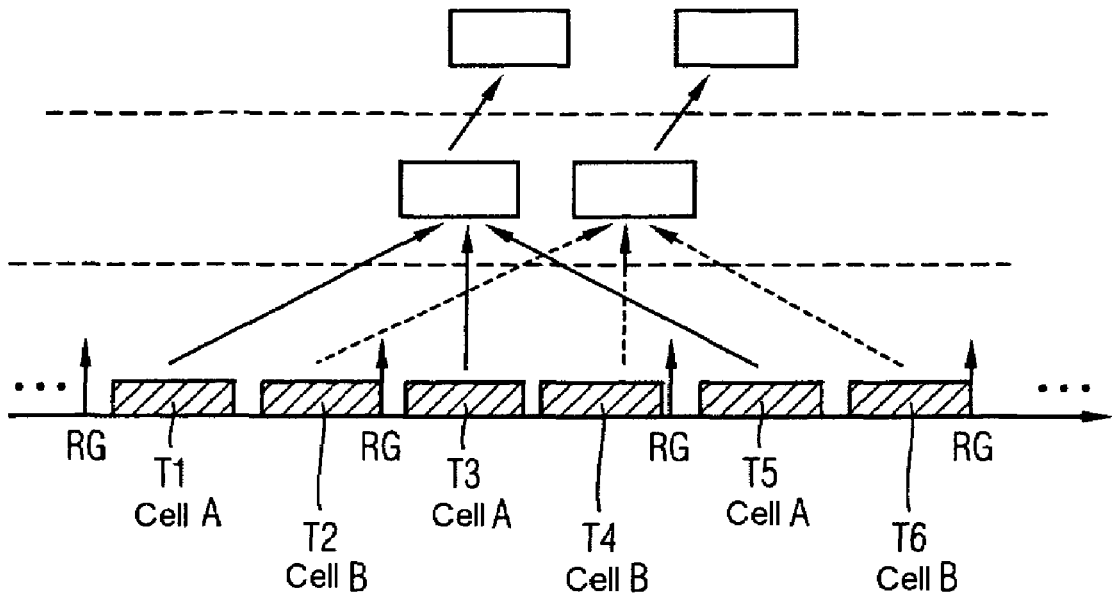

FIGS. 7A and 7B use two different scenarios to illustrate how the various tasks can be processed in an interleaved manner for two cells A and B. A low speed, a low frequency discrepancy and a low noise level have been assumed for the first scenario shown in FIG. 7A. $N_{CORR}$ was set to 10 pilot symbols, and $N_{avg}$ to 4 time slots in a corresponding manner. Furthermore $N_{avg\_fading}$ was set to be 8 frames and RI to be 2 frames. A high speed, a high frequency discrepancy and a low noise level were assumed in a corresponding manner for the scenario shown in FIG. 7B. $N_{CORR}$ was set to 1 pilot symbol and $N_{avg}$ in a corresponding manner to 4 time slots. Furthermore, $N_{avg\_fading}$ was set to 4 frames and RI to 1 frame.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for determination and selection of transmission paths in a mobile communication terminal between a transmitter and a receiver, the method comprising:
   determining an initial delay profile according to a correlation sequence and initial influencing parameters;
   selecting initial transmission paths;
   performing an initial finger allocation according to the initial delay profile and the selected initial paths; and
   repeatedly performing the following at a repetition interval:
      updating influencing parameters;
      determining an additional delay profile according to a correlation sequence and the updated influencing parameters;
      selecting updated transmission paths; and
      performing an additional finger allocation according to the additional delay profile and the selected updated transmission paths,
   wherein the repetition interval is a function of a relative speed between the transmitter and the receiver, of a frequency error between a carrier frequency of a received signal and a reference frequency that is set at the receiver, and of a noise level of the received signal.

2. The method of claim 1, wherein determining the initial delay profile comprises correlating a received correlation signal containing the correlation sequence with a predetermined correlation sequence.

3. The method of claim 1, wherein the initial influencing parameters are set to preset values of an operating state.

4. The method of claim 1, wherein the initial influencing parameters comprise a relative speed parameter, a frequency discrepancy parameter and a noise level parameter.

5. The method of claim 1, wherein the updated influencing parameters comprise a relative speed parameter, a frequency discrepancy parameter and a noise level parameter.

6. The method of claim 1, wherein determining an additional delay profile is additionally determined according to averaging previous additional delay profiles.

7. The method of claim 1, wherein determining the additional delay profile comprises correlating a received correlation signal containing the correlation sequence with a predetermined correlation sequence by one or more correlation parameters.

8. The method of claim 7, wherein the one or more correlation parameters includes a correlation length NCORR, which is formed from a number of successive pilot symbols, of the received correlation signal.

9. The method of claim 7, wherein the one or more correlation parameters includes a number $N_{avg}$ of correlation results to be averaged.

10. The method of claim 7, wherein the one or more correlation parameters includes a number $N_{avg}$ fading of averaged delay profiles.

11. The method of claim 1, wherein selecting updated transmission paths comprises finding clusters of transmission paths according to a predetermined assessment criteria and selecting the updated transmission paths from the found clusters.

12. The method of claim 1, wherein selecting updated transmission paths is performed according to a maximum number of paths to be selected and a minimum interval in the delay time between adjacent paths.

13. The method of claim 1, further comprising assigning the selected updated transmission paths to rake fingers in a rake receiver unit in a mobile communication terminal according to the additional finger allocation.

14. The method of claim 13, further comprising detecting sampling time errors in the rake fingers and adjusting a sampling rate for respective rake fingers according to sampling time errors.

15. The method of claim 13, wherein a path delay time of the rake receiver is shifted by a predetermined time period when a magnitude of an error signal exceeds a predetermined value.

16. An apparatus for selecting transmission paths and setting rake fingers comprising:
   a path determination unit that determines transmission paths of a received signal and determines associated path delay times;
   a threshold value selection unit that selects values for path selection parameters; and
   a parameter determination unit coupled to the path determination unit that provides updated estimation parameters to the path determination unit for use in determining the associated path delay times,
   wherein the parameter determination unit is configured to provide the updated estimation parameters repeatedly according to a repetition interval that is a function of an estimated relative speed between a transmitter and a receiver, an estimated frequency error between a carrier frequency of the received signal and a reference frequency that is set at the receiver, and an estimated noise level of the received signal.

17. The apparatus of claim 16, further comprising a path selection unit connected to the threshold value selection unit that finds clusters of transmission paths on the basis of predetermined assessment criteria and that selects paths from the found clusters.

18. The apparatus of claim 17, further comprising:
   a relative speed estimator coupled to the parameter determination unit that measures received signals and generates the estimated relative speed;
   a frequency error estimator coupled to the parameter determination unit that measures received signals and generates the estimated frequency error; and
   a noise level estimator coupled to the parameter determination unit that measures received signals and generates the estimated noise level.

19. The apparatus of claim 17, further comprising a finger allocation unit coupled to the parameter determination unit and the path selection unit that allocates rake fingers according to selected paths from the path selection unit and the updated estimation parameters from the parameter determination unit.

20. The apparatus of claim 19, further comprising a signal-to-interference-and-noise estimator coupled to the finger allocation unit that generates a signal-to-interference-and-noise ratio from the determined transmission paths and provides the signal-to-interference-and-noise ratio to the finger allocation unit.

21. The apparatus of claim 19, further comprising a sampling time correction mechanism associated with the rake fingers coupled to the path selection unit that disconnects individual rake fingers on path delay times being less than a threshold value.

22. An apparatus for selecting transmission paths and setting rake fingers comprising:

a common path determination unit that determines transmission paths of a received signal and determines associated path delay times;

a first base station comprising:

a first threshold value selection unit that selects values for path selection parameters according to the determined path delay times from the common path determination unit;

a first parameter determination unit that provides updated estimation parameters to the common path determination unit for use in determining the associated path delay times, wherein the first parameter determination unit is configured to provide the updated estimation parameters repeatedly according to a repetition interval that is a function of an estimated relative speed between the first base station and the apparatus, an estimated frequency error between a carrier frequency of the received signal and a reference frequency that is set at the apparatus, and an estimated noise level of the received signal; and a first path selection unit that selects paths from the transmission paths according to the updated estimation parameters from the first parameter determination unit and to the selected values from the first threshold value selection unit;

a second base station comprising:

a second threshold value selection unit that selects values for path selection parameters according to the determined path delay times with path weights from the common path determination unit;

a second parameter determination unit that provides updated estimation parameters to the common path determination unit for use in determining the associated path delay times, wherein the second parameter determination unit is configured to provide the updated estimation parameters repeatedly according to a repetition interval that is a function of an estimated relative speed between the second base station and the apparatus, an estimated frequency error between a carrier frequency of the received signal and a reference frequency that is set at the apparatus, and an estimated noise level of the received signal; and a second path selection unit that selects paths from the transmission paths according to the updated estimation parameters from the second parameter determination unit and to the selected values from the second threshold value selection unit;

a finger allocation unit coupled to the first path selection component and the second path selection component that allocates the selected paths from the first path selection component and the selected paths from the second path selection component to rake fingers.

23. The apparatus of claim 22, further comprising a first time variant interpolators associated with the first base station that compensates for sampling time errors for the rake fingers by altering the sampling rate.

24. The apparatus of claim 22, wherein the first path selection unit also employs a length of successive pilot symbols compared with length of successive pilot symbols from the transmission paths for selecting the paths.

* * * * *